(12) United States Patent
Like

(10) Patent No.: US 11,705,706 B2
(45) Date of Patent: Jul. 18, 2023

(54) BOLT SUPPORT FOR A JUNCTION BOX ASSEMBLY

(71) Applicant: Sumitomo Wiring Systems, Ltd., Yokkaichi (JP)

(72) Inventor: Nathan Like, Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 253 days.

(21) Appl. No.: 17/148,046

(22) Filed: Jan. 13, 2021

(65) Prior Publication Data
US 2022/0224093 A1    Jul. 14, 2022

(51) Int. Cl.
| H02G 3/14 | (2006.01) |
| H01R 13/621 | (2006.01) |
| H02G 3/08 | (2006.01) |
| H01R 13/50 | (2006.01) |

(52) U.S. Cl.
CPC .............. *H02G 3/14* (2013.01); *H01R 13/50* (2013.01); *H01R 13/6215* (2013.01); *H02G 3/081* (2013.01)

(58) Field of Classification Search
CPC .. H01R 13/50; H01R 13/6215; H01R 13/512; B60R 16/0238; B60R 16/0239; H02G 3/0683; H02G 3/081; H02G 3/14
See application file for complete search history.

(56) References Cited

U.S. PATENT DOCUMENTS 5,336,116 A * 8/1994 Boteler .................. H01R 24/66
439/690

* cited by examiner

*Primary Examiner* — Vanessa Girardi
(74) *Attorney, Agent, or Firm* — Honigman LLP

(57) ABSTRACT

A junction box assembly includes an upper housing, a lower housing, a connector assembly and a bolt. The upper housing includes a bolt support. The bolt support is a cylindrical member having a top surface and a through hole. The lower housing includes a bottom through hole. The connector assembly further including a threaded bore. A bolt having a threaded end is disposed in the through hole of the upper housing, the bottom through hole of the lower housing and threadedly engaged with the threaded bore of the connector assembly so as to secure the upper housing, lower housing and connector assembly together. The top surface of the cylindrical member includes a plurality of holes, each of the plurality of holes being closed at a bottom end.

10 Claims, 5 Drawing Sheets

BOLT SUPPORT FOR A JUNCTION BOX ASSEMBLY

TECHNICAL FIELD

This disclosure relates to a bolt support for a junction box assembly.

BACKGROUND

A junction box assembly includes an upper housing, a lower housing, a connector assembly and a bolt. The upper housing includes a bolt support. The bolt support is a cylindrical member having a top surface and a through hole. The lower housing includes a bottom through hole. The connector assembly further including a threaded bore. A bolt having a threaded end is disposed in both the through hole of the upper housing and the bottom through hole of the lower housing. The bolt is threadedly engaged with the threaded bore of the connector assembly so as to secure the upper housing, lower housing and connector assembly together.

In the manufacturing process, the bolt is threaded to the connector assembly using an electric drill. The electric drill may rotate up to one-thousand (1,000) times a minute, which may generate sufficient heat to deform the bolt support. For example, the heat may expand the material and generate hot spots which lead to warping of the through hole, and the bolt support in general. The deformation may result in a loose connection between the upper housing and the lower housing.

Accordingly, it remains desirable to have bolt support which is configured to mitigate the effects heat generated by an electric drill.

SUMMARY

An upper housing for use in a junction box assembly is provided. The upper housing includes a bolt support. The bolt support is disposed the upper housing. The bolt support is a generally cylindrical member having a through hole and a top surface. The top surface of the cylindrical member includes a plurality of holes.

In one aspect of the upper housing, the cylindrical member includes an upper portion extending from a top surface of the upper housing and a bottom portion extending from a bottom surface of the upper housing.

In one aspect of the upper housing, each of the plurality of holes is closed at a bottom end.

In one aspect of the upper housing, the bolt support includes a bead bounding a peripheral edge of the top surface.

In one aspect of the upper housing, a plurality of ribs is disposed on the top surface of the housing and extending from an outer surface of the upper portion.

In one aspect of the upper housing, each of the plurality of holes are equally spaced apart from each other.

In one aspect of the upper housing, each of the plurality of holes is radial with respect to the through hole.

A junction box assembly is also provided. The junction box assembly includes an upper housing, a lower housing, a connector assembly and a bolt. The upper housing includes a bolt support. The bolt support is a generally cylindrical member having a top surface and a through hole. The lower housing includes a connector assembly housing. The connector assembly housing is configured to receive a plurality of male terminal blades. The lower housing further includes a bottom through hole. The connector assembly includes a plurality of terminal slots for receiving the male terminal blades. The connector assembly further includes a threaded bore. The bolt includes a threaded end. The bolt is disposed in the through hole of the upper housing, the bottom through hole of the lower housing and threadedly engaged with the threaded bore of the connector assembly so as to secure the upper housing, lower housing and connector assembly together. The top surface of the cylindrical member includes a plurality of holes.

In one aspect of the junction box assembly, the cylindrical member includes an upper portion extending from a top surface of the upper housing and a bottom portion extending from a bottom surface of the upper housing.

In one aspect of the junction box assembly, each of the plurality of holes is closed at a bottom end.

In one aspect of the junction box assembly, the bolt support includes a bead bounding a peripheral edge of the top surface.

In one aspect of the junction box assembly, a plurality of ribs is disposed on the top surface of the housing and extending from an outer surface of the upper portion.

In one aspect of the junction box assembly, each of the plurality of holes are equally spaced apart from each other.

In one aspect of the junction box assembly, each of the plurality of holes is radial with respect to the through hole.

Accordingly, an upper housing and a junction box having an upper housing is provided with a bolt support having a plurality of holes, each of the plurality of holes being closed at a bottom end.

DETAILED DESCRIPTION

Figure 1:
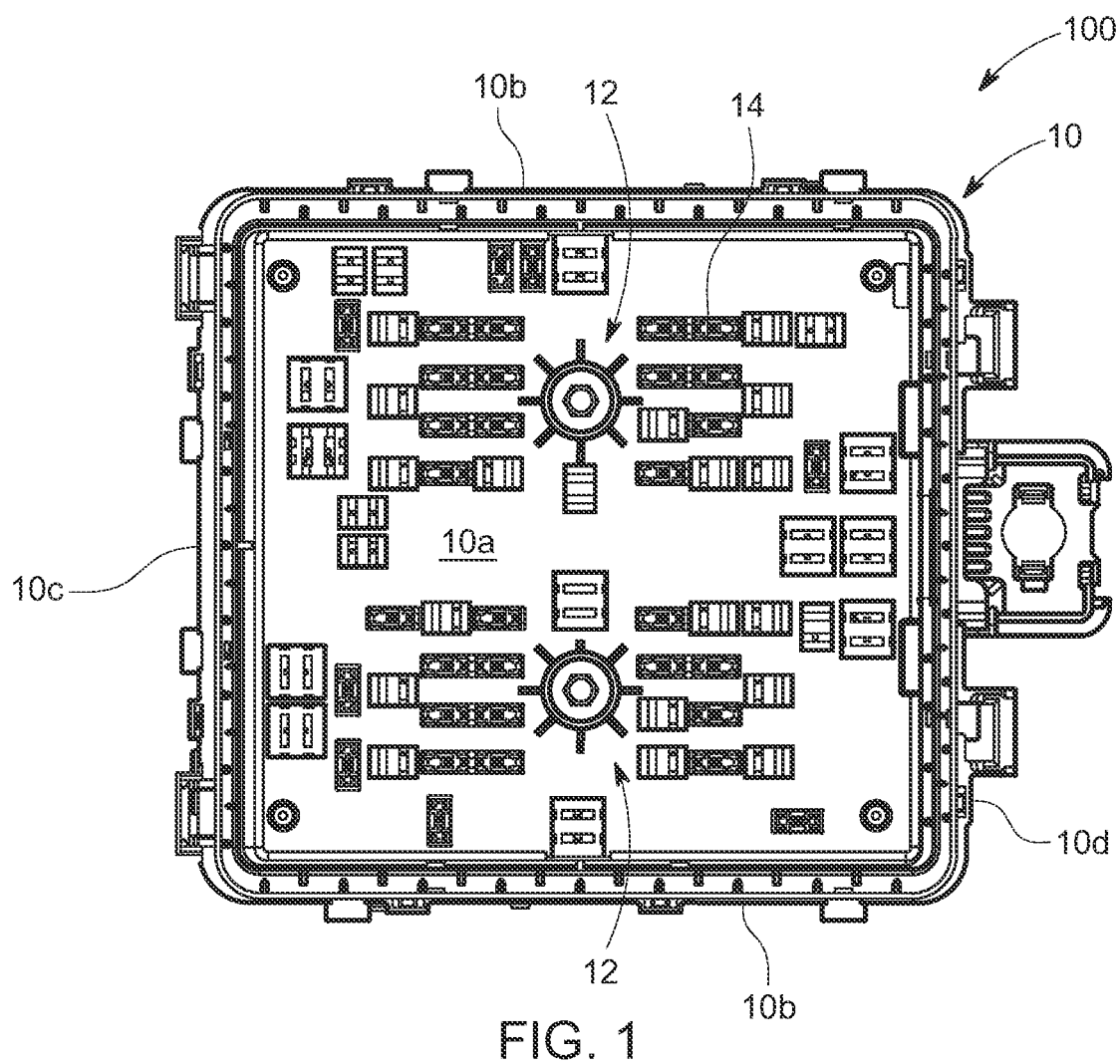
FIG. 1 is a top down view of an upper housing according to the principles of the present disclosure.

A junction box assembly includes an upper housing, a lower housing, a connector assembly and a bolt. The upper housing includes a bolt support. The bolt support is a cylindrical member having a top surface and a through hole. The lower housing includes a bottom through hole. The connector assembly further includes a threaded bore. A bolt having a threaded end is disposed in the through hole of the upper housing and the bottom through hole of the lower housing. The bolt is threadedly engaged with the threaded bore of the connector assembly so as to secure the upper housing, lower housing and connector assembly together.

The top surface of the cylindrical member includes a plurality of holes. The holes provide a tolerance for an expansion due to heat generated by an electric screw driver, thus preventing the outer dimension of the bolt support from deforming so as to maintain a tight connection between the upper housing, a lower housing, a connector assembly and a bolt.

With reference now to FIGS. 1-4 an aspect of an upper housing 10 is provided. The upper housing 10 is part of a junction box assembly 100. The upper housing 10 is formed of a material suitable for injection molding, illustratively including polypropylene, Acrylonitrile butadiene styrene, polyoxymethylene, polycarbonate and the like.

The upper housing 10 is shown as being generally rectangular; however, it should be appreciated that the dimension of the upper housing 10 may deviate from what is shown without limiting the scope of the appended claims. In this example, the dimension of the upper housing 10 is designed to fit within a packaging space of an automotive vehicle, and accommodate a selected number of electric components. The upper housing 10 may include conventional attachment features such as resilient tabs and hooks configured to secure the upper housing 10 to other parts of the junction box assembly 100. In one aspect, the upper housing 10 is further configured to protect and cover electrical components housed within the junction box assembly 100, as will be described in further detail. The upper housing 10 includes a top surface 10a, pair of sidewalls 10b, a front wall 10c and a back wall 10d which bound the top surface 10a.

The upper housing 10 includes a bolt support 12 and a plurality of upper terminal slots 14 for receiving electric components (not shown) such as fuses, relays and the like. The bolt support 12 and the terminal slots 14 are formed on the top surface 10a of the upper housing 10. For illustrative purposes, the upper housing 10 is shown as having a pair of bolt supports 12.

FIG. 1 is a top down view of the upper housing 10 showing bolts 200 disposed within each bolt support 12. For illustrative purposes, the upper housing 10 is shown as having a pair of bolt supports 12. Each of the bolt supports 12 is configured to receive a bolt 200 for securing a respective pair of connector assemblies 30, as will be described in further detail below. Accordingly, the number of bolt supports 12 shown is not limiting to the scope of the appended claims.

The bolt support 12 is disposed on the upper housing 10. The bolt support 12 is also formed of a material suitable for injection molding, illustratively including polypropylene, Acrylonitrile butadiene styrene, polyoxymethylene, polycarbonate and the like. It should be appreciated that the bolt support 12 may be formed as an integral part of the upper housing 10.

Figure 2:
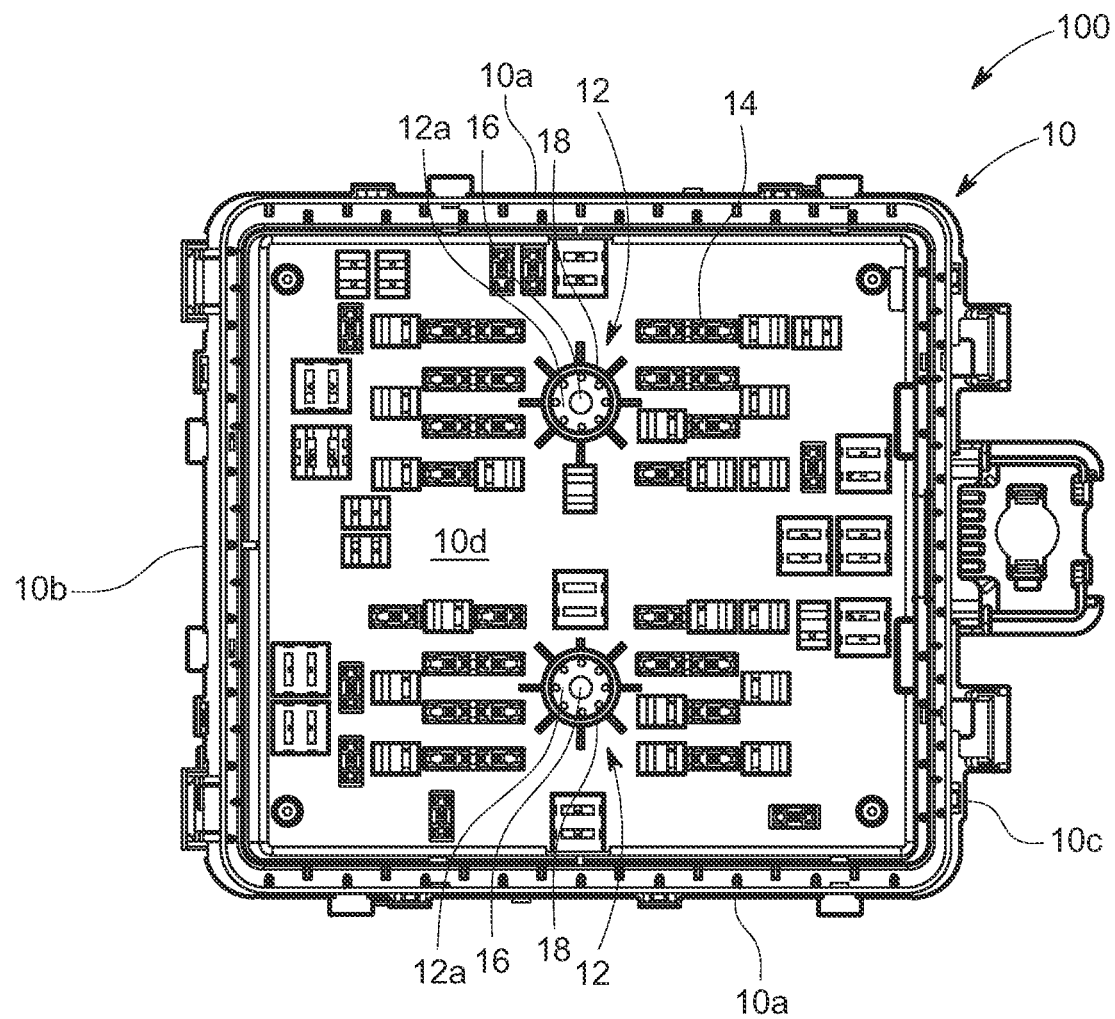
FIG. 2 is a view of FIG. 1 showing a bolt disposed within the through holes.
Figure 3:
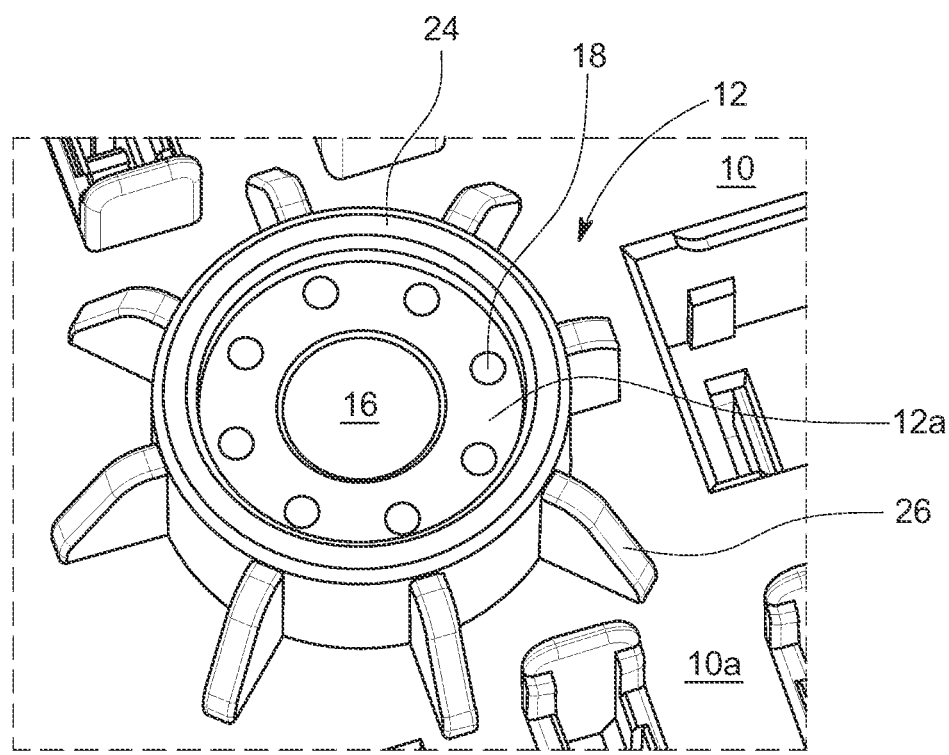
FIG. 3 is an isolated view of one of the bolt supports shown in FIGS. 1 and 2.
Figure 4:
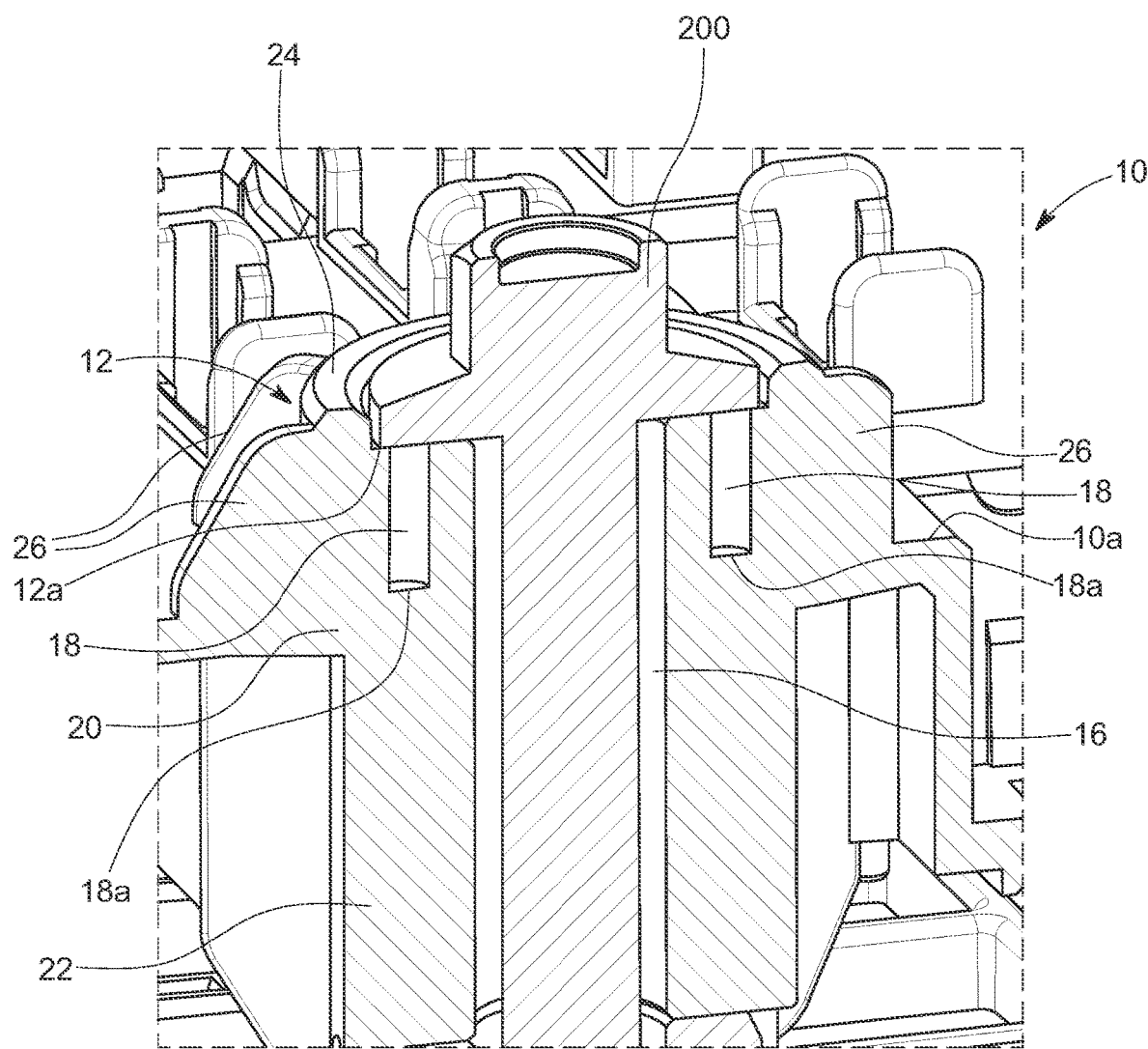
FIG. 4 is a cross-sectional view of the bolt support shown in FIG. 1.

With reference now to FIGS. 2, 3 and 4, a detailed description of the bolt support 12 is provided. The bolt support 12 is a generally cylindrical member having an upper through hole 16 and a top surface 12a. The top surface 12a of the bolt support 12 is a generally planar surface and the upper through hole 16 is generally centered on the top surface 12a. The top surface 12a of the cylindrical member includes a plurality of holes 18. FIG. 2 is a top down view of the upper housing 10 with the bolts 200 removed. FIG. 2 illustrates the upper through hole 16 of the bolt support 12 extending along an axis into the lower housing 28.

In one aspect of the upper housing 10, the bolt support 12 includes an upper portion 20 and a bottom portion 22. The upper portion 20 extends from a top surface 10a of the upper housing 10. The bottom portion 22 extends from a bottom surface 10b of the upper housing 10. In one aspect, the bottom portion 22 is longer than the upper portion 20. The upper through hole 16 extends through the upper portion 20 and the bottom portion 22. The upper through hole 16 has a uniform diameter and defines an open top and an open bottom of the bolt support 12, so as to receive a bolt 200.

In one aspect of the upper housing 10, each of the plurality of holes 18 is closed at a bottom end 18a. For illustrative purposes, the bolt support 12 is shown as having eight (8) holes 18. In one aspect of the upper housing 10, each of the plurality of holes 18 is radial with respect to the upper through hole 16. Each of the plurality of holes 18 are shown as being equally spaced apart from each other.

As shown in FIGS. 2-4, the bolt support 12 may further include a bead 24. The bead 24 may be integrally formed to the bolt support 12. The bead 24 bounds a peripheral edge of the top surface 12a of the bolt support 12 so as to place the top surface 12a in a recessed relationship with respect to the bead 24. As shown in FIGS. 1 and 4, the bolt 200 may include a head portion having a hexagonal dimension and a flange bounding the head portion. The bead 24 may have a height that is generally the same as a height of the flange of the head portion of the bolt 200.

The upper housing 10 may further include a plurality of ribs 26. The ribs 26 are configured to retain the upper portion 20 of the bolt support 12 in a rigid and upright manner. The ribs 26 are is disposed on the top surface 10a of the upper housing 10 and extend from an outer surface of the upper portion 20 of the bolt support 12. The ribs 26 may be integrally formed to the upper housing 10.

Figure 5:
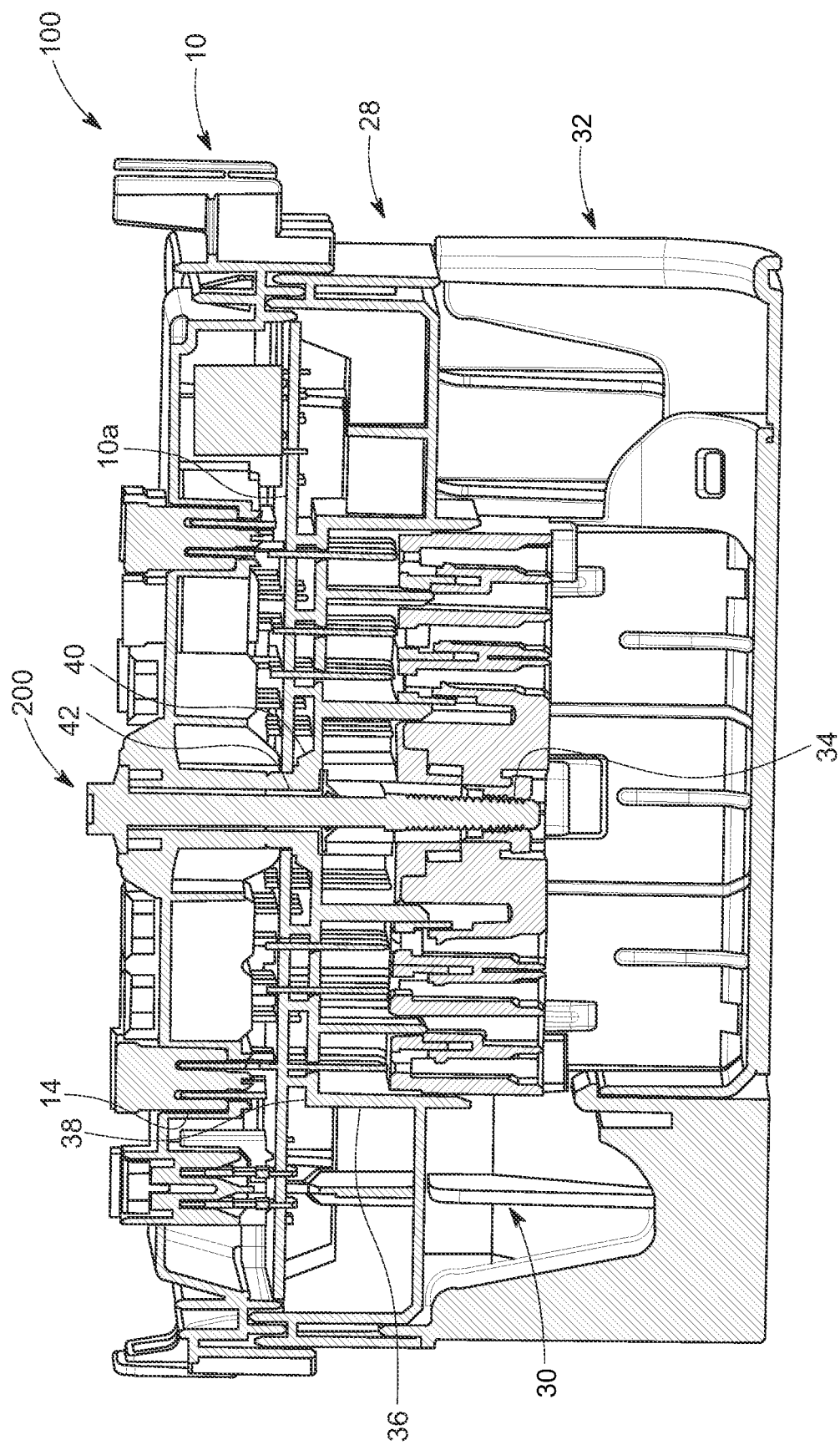
FIG. 5 is a cross-sectional view of FIG. 1 taken along line 5-5.

With reference again to FIGS. 1-4 and now to FIG. 5, a junction box assembly 100 is also provided. The junction box assembly 100 is formed of a material suitable for injection molding, illustratively including polypropylene, Acrylonitrile butadiene styrene, polyoxymethylene, polycarbonate and the like. The junction box assembly 100 includes an upper housing 10, a lower housing 28, a connector assembly 30, a bottom cover 32 and a bolt 200.

The upper housing 10 is mounted onto the lower housing 28. The lower housing 28 is mounted to bottom cover 32. The upper housing 10 includes upper terminal slots 14 for receiving terminals of various electronic components such as fuses and relays. As shown in FIG. 5, the electronic components are fitted onto the top surface 10a of the upper housing 10.

The upper housing 10 includes a bolt support 12. The bolt support 12 is a generally cylindrical member having a top surface 12a and an upper through hole 16. The bolt 200 includes a threaded end 202. The bolt 200 is disposed in the upper through hole 16 of the upper housing 10, a bottom through hole 42 of the lower housing 28 and threadedly engaged with a threaded bore 34 of the connector assembly 30 so as to secure the upper housing 10, lower housing 28 and connector assembly 30 together.

The top surface 12a of the cylindrical member of the bolt support 12 includes a plurality of holes 18, each of the plurality of holes 18 being closed at a bottom end 18a. The plurality of holes 18 are radial with respect to the upper through hole 16. Each of the plurality of holes 18 may be equally spaced apart from each other. As shown in FIG. 5, the holes 18 may have a length extending from the top surface 10a of the upper housing 10 to the top surface 12a of the cylindrical member of the bolt support 12. In one aspect, the holes 18 are generally uniform in diameter and are dimensioned to be the same as each other. However, it should be appreciated that the holes 18 may be shaped differently from each other or may have an irregular diameter.

In one aspect of the junction box assembly 100, the cylindrical member of the bolt support 12 includes an upper portion 20 extending from the top surface 10a of the upper housing 10 and a bottom portion 22 extending from a bottom surface 10b of the upper housing 10. The bolt support 12 may further include a bead 24 bounding a peripheral edge of the top surface 12a. The bolt support 12 may further include a plurality of ribs 26 disposed on the top surface 12a of the upper housing 10 and extending from an outer surface of the upper portion 20 of the bolt support 12.

The lower housing 28 includes a connector assembly housing 36. The connector assembly housing 36 is configured to house a plurality of male terminal blades. The connector assembly housing 36 includes a top wall 38. The top wall 38 includes a collar portion 40 having a bottom through hole 42 for receiving the bolt 200. The collar portion 40 is an annular member having a top edge 40a. In assembly, a bottom edge 22a of the bottom portion 22 of the bolt support 12 is seated onto the top edge 40a of the annular member of the collar portion 40. For illustrative purposes, the collar portion 40 is shown as being generally centered with respect to the top wall 38 of the connector assembly housing 36.

The connector assembly 30 is fitted to the connector assembly housing 36. The connector assembly 30 may be a generally cuboidal member having a plurality of terminal slots, each of which may hold a female terminal for receiving a male terminal blades. The connector assembly 30 further includes a threaded bore 34. The threaded bore 34 may be centered within the cuboidal body. The threaded bore 34, the bottom through hole 42 and the upper through hole 16 of the upper housing 10 are axially aligned with each other when the junction box assembly 100 is assembled.

The junction box assembly 100 is assembled together by mounting the upper housing 10 onto the lower housing 28, fitting the connector assembly 30 to the connector assembly housing 36 of the lower housing 28 and mounting the lower housing 28 onto the bottom cover 32. A dress cover 44 may be held within the bottom cover 32 and fitted to the connector assembly 30. The bolt 200 is then inserted into the upper through hole 16 of the upper housing 10, the bottom through hole 42 and the threaded bore 34 of the connector assembly 30.

An electric drill may be used to screw the threaded end 202 of the bolt 200 into the threaded bore 34, so as to secure the upper housing 10, lower housing 28 and connector assembly 30 together. The heat generated by the electric drill may be sufficient to expand the bolt support 12, wherein the holes 18 allow for the expansion so as to prevent the bolt support 12 from being damaged by a heat deformation. Accordingly, a tight connection is maintained between the upper housing 10, the lower housing 28, and the connector assembly 30.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

I claim:

1. An upper housing for use in a junction box assembly, the upper housing comprising:
   a bolt support, the bolt support disposed in the upper housing, the bolt support being a cylindrical member having a through hole, a top surface of the bolt support having a plurality of holes, wherein the bolt support includes an upper portion projecting upwardly from a top surface of the upper housing and a bottom portion extending downwardly from a bottom surface of the upper housing, and wherein each of the plurality of holes is closed at a bottom end, the bottom end disposed within the upper portion.

2. The upper housing as set forth in claim 1, further including a bead bounding a peripheral edge of the top surface.

3. The upper housing as set forth in claim 1, further including a plurality of ribs disposed on the top surface of the housing and extending from an outer surface of the upper portion.

4. The upper housing as set forth in claim 1, wherein each of the plurality of holes are equally spaced apart from each other.

5. The upper housing as set forth in claim 1, wherein each of the plurality of holes is radial with respect to the through hole.

6. A junction box assembly comprising:
   an upper housing having a bolt support, the bolt support being a cylindrical member having a top surface and a through hole;
   a lower housing having a connector assembly housing, the connector assembly housing configured to receive a plurality of male terminal blades and a bottom through hole;
   a connector assembly having a plurality of terminal slots for receiving a respective one of the plurality of male terminal blades, the connector assembly further including a threaded bore;
   a bolt having a threaded end, the bolt disposed in the through hole of the upper housing, the bottom through hole of the lower housing and threadedly engaged with the threaded bore of the connector assembly so as to secure the upper housing, lower housing and connector assembly together; and
   wherein the top surface of the cylindrical member includes a plurality of holes, and wherein the cylindrical member includes an upper portion projecting upwardly from a top surface of the upper housing and a bottom portion extending downwardly from a bottom surface of the upper housing, and wherein each of the plurality of holes is closed at a bottom end, the bottom end disposed within the upper portion.

7. The junction box assembly as set forth in claim 6, further including a bead bounding a peripheral edge of the top surface.

8. The junction box assembly as set forth in claim 6, further including a plurality of ribs disposed on the top surface of the housing and extending from an outer surface of the upper portion.

9. The junction box assembly as set forth in claim 6, wherein each of the plurality of holes are equally spaced apart from each other.

10. The junction box assembly as set forth in claim 6, wherein each of the plurality of holes is radial with respect to the through hole.

* * * * *